US009203456B2

(12) United States Patent
Teng et al.

(10) Patent No.: US 9,203,456 B2
(45) Date of Patent: Dec. 1, 2015

(54) MOBILE DEVICE

(71) Applicant: HTC Corporation, Taoyuan County (TW)

(72) Inventors: Pei-Ling Teng, Taoyuan County (TW); Yi-Chun Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 396 days.

(21) Appl. No.: 13/626,874

(22) Filed: Sep. 25, 2012

(65) Prior Publication Data

US 2014/0087674 A1 Mar. 27, 2014

(51) Int. Cl.
| H04B 1/38 | (2015.01) |
| H04B 1/3888 | (2015.01) |
| H01R 13/6595 | (2011.01) |
| H01Q 1/24 | (2006.01) |
| H01Q 5/35 | (2015.01) |

(52) U.S. Cl.
CPC ............... *H04B 1/38* (2013.01); *H01Q 1/243* (2013.01); *H01Q 5/35* (2015.01); *H04B 1/3888* (2013.01); *H01R 13/6595* (2013.01)

(58) Field of Classification Search
None
See application file for complete search history.

(56) References Cited

U.S. PATENT DOCUMENTS

| 7,215,600 B1 | 5/2007 | DeRosa |
| 8,009,110 B2 | 8/2011 | Teng et al. |
| 2002/0122010 A1* | 9/2002 | McCorkle ............ 343/767 |
| 2008/0150811 A1 | 6/2008 | Honda et al. |
| 2008/0316115 A1 | 12/2008 | Hill et al. |
| 2011/0037662 A1 | 2/2011 | Teng et al. |
| 2011/0133995 A1* | 6/2011 | Pascolini et al. ........ 343/702 |
| 2011/0241949 A1 | 10/2011 | Nickel et al. |
| 2012/0178382 A1 | 7/2012 | Merz et al. |
| 2012/0229347 A1 | 9/2012 | Jin et al. |
| 2013/0135158 A1* | 5/2013 | Faraone et al. ......... 343/702 |

FOREIGN PATENT DOCUMENTS

| CN | 101483270 | 7/2009 |
| CN | 101809878 | 8/2010 |
| EP | 2493009 | 8/2012 |
| TW | M379862 | 5/2010 |
| TW | 201101586 | 1/2011 |
| WO | 2012140882 | 10/2012 |

OTHER PUBLICATIONS

Rodriguez et al, Branch-line and Rat-Race Hybrids, 2011.*
Karacaoglu et al, Dual-Mode Ring-Resonator, 1996.*

(Continued)

*Primary Examiner* — Ping Hsieh
*Assistant Examiner* — James Yang
(74) *Attorney, Agent, or Firm* — Jianq Chyun IP Office

(57) ABSTRACT

A mobile device having a periphery and including a substrate, a feeding line, and a resonance element is provided. The substrate has a ground plane and the feeding line is disposed on the substrate. The resonance element is formed on at least a portion of the periphery. The resonance element is electrically connected to the feeding line and the ground plane respectively via a first feeding point and a first ground point, so as to form a first excitation path. The resonance element receives and transmits a first radio frequency signal and a second radio frequency signal via the first excitation path.

12 Claims, 4 Drawing Sheets

(56) References Cited

OTHER PUBLICATIONS

Ikram et al., "Design and development of a multiband loop antenna for cellular mobile handsets," University of Gavle, Department of Technology and Built Environment, Master's Thesis in Electronics/Telecommunications, Jun. 2010.

"Office Action of Taiwan Counterpart Application", issued on May 28, 2015, p. 1-p. 5.

"Office Action of China Counterpart Application", issued on Apr. 3, 2015, p. 1-p. 9.

* cited by examiner

MOBILE DEVICE

BACKGROUND OF THE INVENTION

1. Field of the Invention

The subject application relates to a mobile device and particularly relates to a mobile device using a metal frame partially formed on a periphery thereof to form a loop antenna.

2. Description of Related Art

As mobile devices rapidly develop, the manufacturers not only need to improve the functions of their products but also need to make their products unique, so as to satisfy the demands from the market. For example, now mobile devices are mostly designed with appearances of metallic texture for emphasizing the uniqueness. However, the appearance design of metallic texture usually requires combining a conductive structure into the mobile device, which may affect signal reception of the mobile device.

In view of this problem, some improvements have been proposed, e.g. U.S. Pat. No. 8,009,110, US 2011/0133995, and US 2011/0241949. Specifically, U.S. Pat. No. 8,009,110 discloses forming a notch on a frame of a housing, and the notch are used to form two ground terminals and a feeding terminal. Accordingly, the frame of the housing forms a loop antenna for the mobile device to receive and transmit radio frequency signals. However, the formation of the notch changes the original structure of the frame and impairs the beautiful streamline appearance of the mobile device.

Moreover, US 2011/0133995 discloses cutting a frame of a housing with a gap and using a part of the frame to form a loop antenna. According to US 2011/0241949, a frame of a housing is also cut with a gap, and a part of the frame is used to form an inverted F antenna (PIFA). However, in the aforementioned disclosures, the formation of the gap damages the original structure of the frame, and the mobile device needs to have a sufficient clearance area at the bottom for forming the loop antenna or the inverted F antenna.

SUMMARY OF THE INVENTION

The subject application provides a mobile device, which uses a resonance element formed on a portion of a periphery of the mobile device to receive and transmit a radio frequency signal, and the resonance element with antenna function enhances the appearance design of the mobile device.

The subject application provides a mobile device which has a periphery and includes a substrate, a feeding line, and a resonance element. The substrate has a ground plane and the feeding line is disposed on the substrate. The resonance element is formed on at least a portion of the periphery. In addition, the resonance element is electrically connected to the feeding line and the ground plane respectively via a first feeding point and a first ground point, so as to form a first excitation path. The resonance element receives and transmits a first radio frequency signal and a second radio frequency signal via the first excitation path.

In an embodiment of the invention, the first excitation path is ¾ of a wavelength of the first radio frequency signal.

In an embodiment of the invention, the periphery includes a metal frame, wherein the resonance element is formed on at least a portion of the metal frame, and the metal frame has a loop structure and surrounds the mobile device.

In an embodiment of the invention, the metal frame is electrically connected with the feeding line and the ground plane respectively via a second feeding point and a second ground point, so as to form a second excitation path that does not overlap the first excitation path. In addition, the metal frame further uses the second excitation path to receive and transmit a third radio frequency signal.

In an embodiment of the invention, the second excitation path is ½ of a wavelength of the third radio frequency signal.

In an embodiment of the invention, a distance between the first feeding point and the second feeding point is ⅛-1/10 of the wavelength of the third radio frequency signal.

In an embodiment of the invention, the mobile device further includes a upper housing and a lower housing. The upper housing includes the metal frame and at least one frame extension section. The resonance element is formed on at least a portion of the metal frame. The upper housing and the lower housing are stacked to form an accommodating space, and the substrate is disposed in the accommodating space.

Based on the above, the metal frame of the subject application is formed on a portion of the periphery, and the resonance element is formed on a portion of the metal frame. Accordingly, the resonance element formed on a portion of the metal frame is used to form the loop antenna that operates in multiple frequency bands. In addition that the metal frame is used to form the antenna for the mobile device, the metal frame with the antenna function has a smooth streamline shape, which enhances the appearance design of the mobile device. Additionally, in comparison with the conventional technology, the clearance area that the mobile device requires is relatively reduced, which is conducive to the miniaturization of the mobile device.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
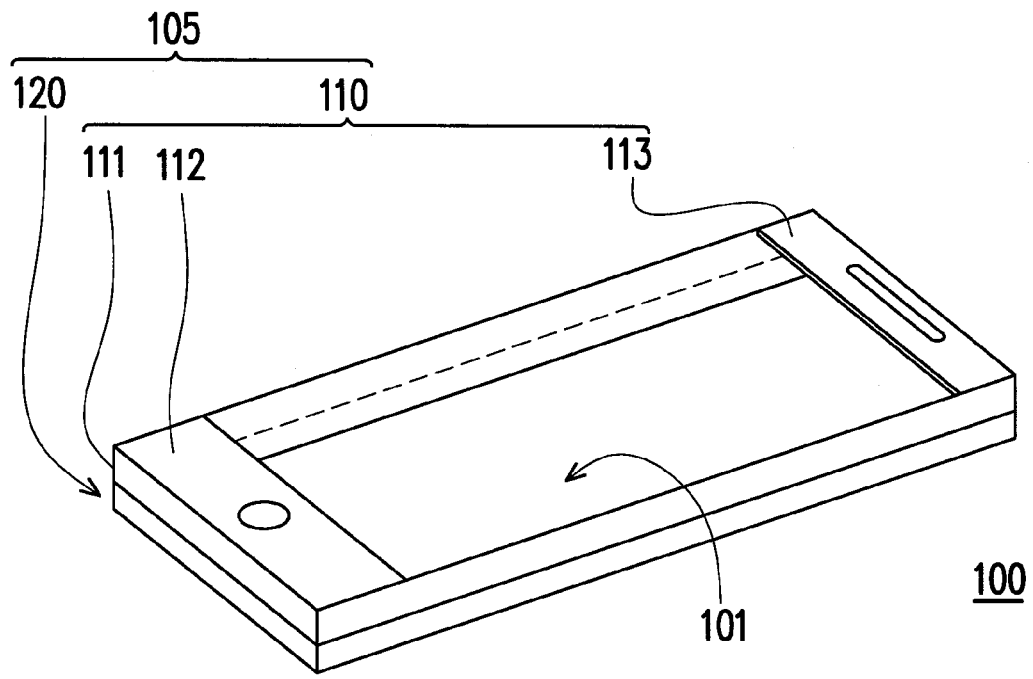
FIG. 1 is a schematic view of a mobile device according to an exemplary embodiment of the invention.

FIG. 1 is a schematic view of a mobile device according to an exemplary embodiment of the invention. Referring to FIG. 1, a mobile device 100 at least includes a periphery, a processor, an input module, a power supply module, a wireless transceiver module, etc., wherein the periphery 105 includes a upper housing 110 and a lower housing 120. The upper housing 110 includes a metal frame 111 and a plurality of frame extension sections 112-113. The upper housing 110 and the lower housing 120 may be integrated into one single housing. The metal frame 111 is formed on at least a portion of the periphery 105. It is noted that the metal frame 111 may be used to constitute an overall side wall of the periphery 105

(upper housing 110) and have an opening 101. The frame extension sections 112-113 are coupled to the metal frame 111 and partially cover the opening 101 of the metal frame 111. The uncovered part of the opening 101 is used for disposing (1) an integrated touch-display module or (2) a touch module and a display module (not shown) of the mobile device 100. That is, the metal frame 111 surrounds the aforementioned modules. In addition, the upper housing 110 and the lower housing 120 are stacked to form an accommodating space.

Figure 2:
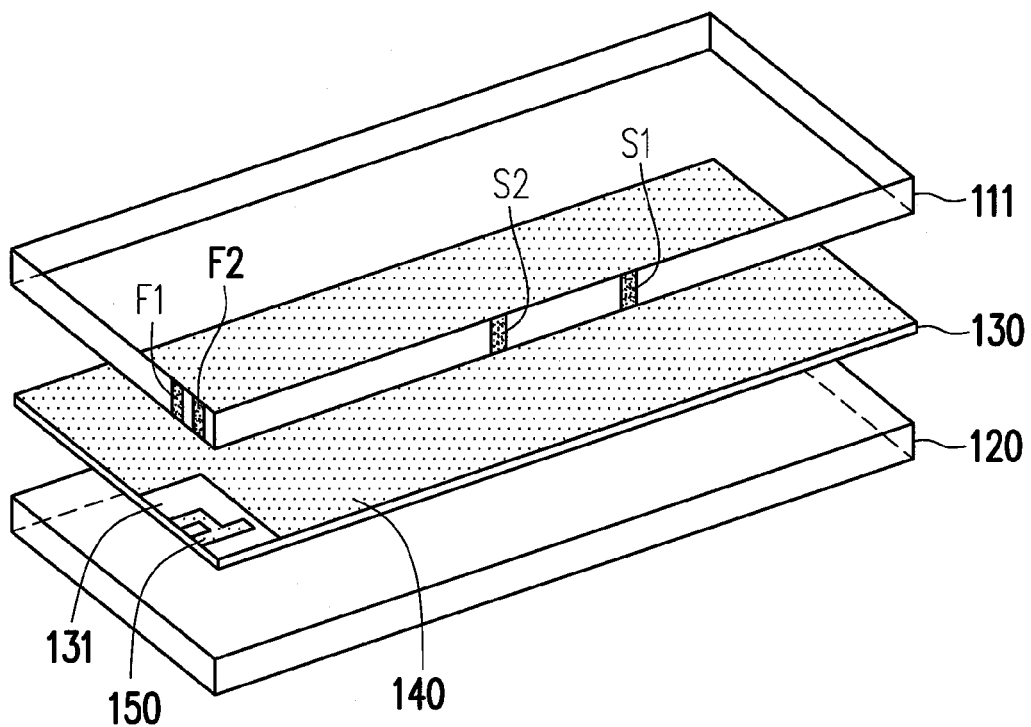
FIG. 2 is a schematic exploded view of a mobile device according to an exemplary embodiment of the invention.
Figure 3:
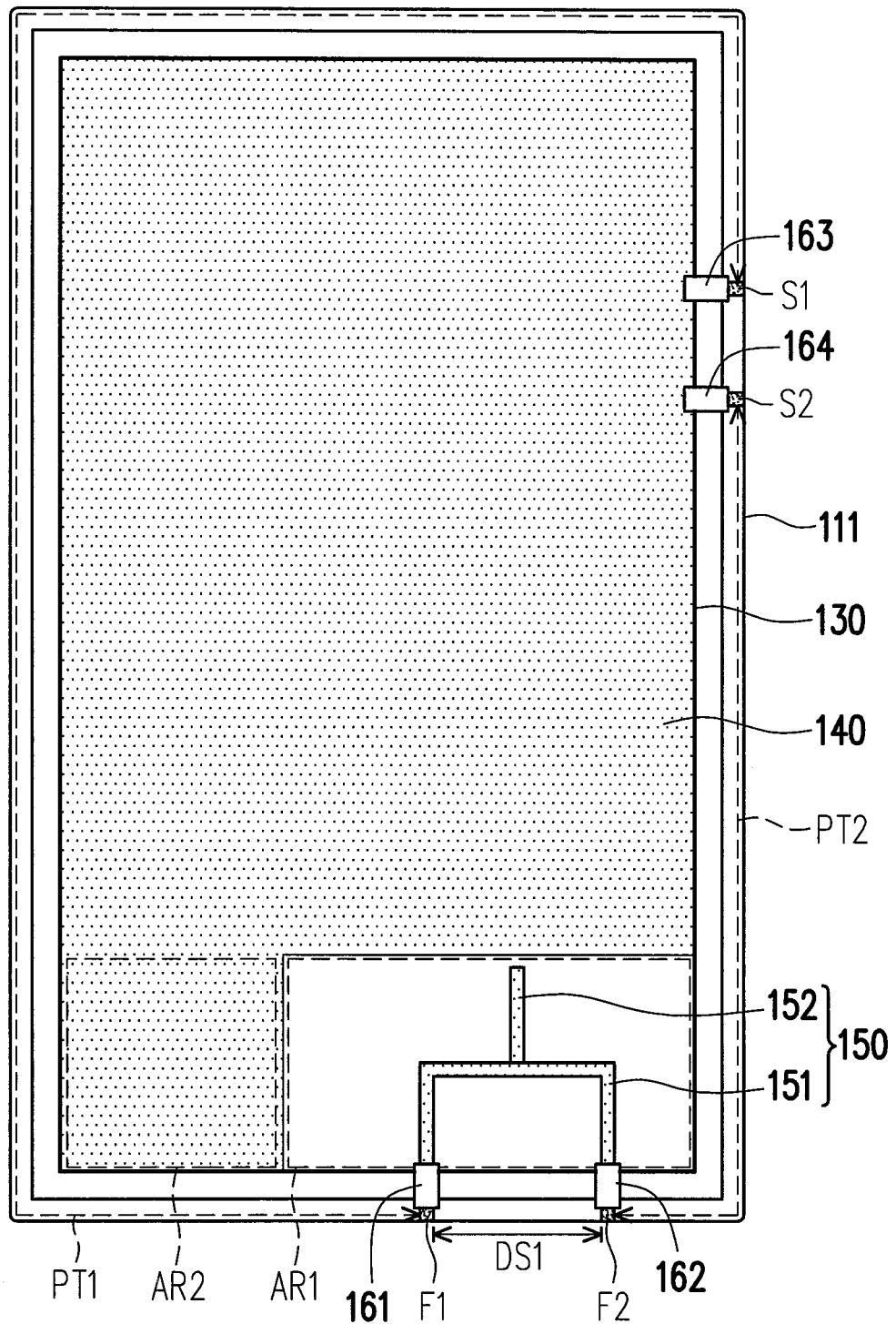
FIG. 3 is a schematic top view of a mobile device according to an exemplary embodiment of the invention.

FIG. 2 is a schematic exploded view of a mobile device according to an exemplary embodiment of the invention. FIG. 3 is a schematic top view of a mobile device according to an exemplary embodiment of the invention. Referring to FIGS. 2 and 3, the mobile device 100 further includes a substrate 130, a ground plane 140, a feeding line 150, and conductive elements 161-164. The substrate 130 is disposed in the accommodating space formed between the upper housing 110 and the lower housing 120. Take the substrate 130 as the reference, the metal frame 111 forms a loop structure that surrounds the substrate 130.

Furthermore, as shown in FIG. 2, the ground plane 140 and the feeding line 150 are disposed on a first surface 131 of the substrate 130. Moreover, in terms of the first surface 131 of the substrate 130 as shown in FIG. 3, an area other than the ground plane 140 on the first surface 131 is defined as a clearance area AR1, and the feeding line 150 is disposed in the clearance area AR1. From another aspect, the substrate 130 includes the ground plane 140 and the clearance area AR1, and the feeding line 150 is disposed in the clearance area AR1.

The metal frame 111 has a first feeding point F1, a second feeding point F2, a first ground point S1, and a second ground point S2. The first feeding point F1, the second feeding point F2, the second ground point S2, and the first ground point S1 are sequentially arranged on the metal frame 111 in a counterclockwise direction. As illustrated in FIG. 3, the conductive element 161 is bridged between the first feeding point F1 and the feeding line 150, so as to electrically connect the first feeding point F1 and the feeding line 150. The conductive element 163 is bridged between the first ground point S1 and the ground plane 140, so as to electrically connect the first ground point S1 and the ground plane 140. In addition, through the first feeding point F1 and the first ground point S1, a first excitation path PT1 is formed to extend from the first feeding point F1 to the first ground point S1.

Furthermore, the conductive element 162 is bridged between the second feeding point F2 and the feeding line 150, so as to electrically connect the second feeding point F2 and the feeding line 150. The conductive element 164 is bridged between the second ground point S2 and the ground plane 140, so as to electrically connect the second ground point S2 and the ground plane 140. In addition, through the second feeding point F2 and the second ground point S2, a second excitation path PT2 is formed to extend from the second feeding point F2 to the second ground point S2. The second excitation path PT2 and the first excitation path PT1 do not overlap each other. More specifically, the conductive elements 161-164 may be elastic pieces or pogo pins, etc., which are electrically conductive elements. The portion of the metal frame 111 that corresponds to the first excitation path PT1 and the second excitation path PT2 is mainly the resonance element for forming an antenna structure. In other words, the metal frame 111 includes the resonance element which is formed on at least a portion of the metal frame 111. The antenna structure at least includes the resonance element, the first feeding point F1, the second feeding point F2, the first ground point S1, the second ground point S2, and the ground plane 140.

To be more detailed, the feeding line 150 includes a first line segment 151 and a second line segment 152. Two ends of the first line segment 151 are respectively electrically connected to the first feeding point F1 and the second feeding point F2 via the conductive elements 161 and 162. In addition, a first end of the second line segment 152 is electrically connected to the first line segment 151. In terms of operation, the mobile device 100 feeds a signal from the wireless transceiver module (now shown) to a second end of the second line segment 152 via a coaxial cable (not shown), wherein an inner conductor of the coaxial cable is electrically connected to the second end of the second line segment 152, and an outer conductor of the coaxial cable is electrically connected to the ground plane 140. Accordingly, the portion of the metal frame 111 excites different resonance modes through the resonance element (i.e. the first excitation path PT 1 and the second excitation path PT2). That is to say, the mobile device 100 uses the metal frame 111 to form a loop antenna for operation in a multi-band.

It should be noted that the metal frame 111 formed on a portion of the periphery 105 has a continuous and non-interrupted loop structure, and there is no gap that breaks the metal frame 111. Moreover, the feeding points F1-F2 and the ground points S1-S2 on the metal frame 111 serve as the contact points that connect the metal frame 111 to the feeding line 150 and the ground plane 140. Therefore, in this embodiment, the feeding points and the ground points are formed on the metal frame 111 without disposing any notch or hole, which may damage the original structure of the metal frame 111. In addition that the metal frame 111 is used to form the antenna structure for the mobile device 100, the metal frame 111 with the antenna function has a streamline shape, which enhances the appearance design and structural strength of the mobile device 100. Further to the above, the frame extension sections 112-113 and/or the lower housing 120 of the mobile device 100 may also be made of a conductive material, such that the appearance of the mobile device 100 has a modern and fashionable metal texture.

Specifically, the metal frame 111 uses the first excitation path PT1 to excite a first resonance mode. In addition, the feeding points and the ground points on the metal frame 111 may be adjusted to respectively adjust a resonance frequency and its harmonic frequency excited on the metal frame 111 in the first resonance mode to a first frequency band (e.g. GSM850/EGSM frequency band) and a second frequency band (e.g. Bluetooth® frequency band). Accordingly, the metal frame 111 uses the first excitation path PT1 to receive and transmit the first radio frequency signal and the second radio frequency signal. The first radio frequency signal is for example a signal in the first frequency band. That is to say, a frequency of the first radio frequency signal is 850 MHz, for example. The second radio frequency signal is for example a signal in the second frequency band. That is to say, a frequency of the second radio frequency signal is 2.4 GHz, for example.

It is noted that, as shown in FIG. 3, the clearance area AR1 on the substrate 130 is mainly used for disposing the feeding line 150. In comparison with the conventional technology, the clearance area AR1 that the mobile device 100 requires is relatively reduced. For instance, in this embodiment, the clearance area AR1 does not cover the whole bottom of the substrate 130. Thus, in comparison with the conventional technology, the mobile device 100 has a spare area AR2 for disposing the ground plane 140. Accordingly, the ground plane 140 in the area AR2 and a bent structure (e.g. corner of the frame) of the metal frame 111 may be used to extend the first excitation path PT1. Therefore, in actual application, the first excitation path PT1 may be less than a wavelength of the first radio frequency signal. For example, the first excitation path PT1 is ¾ of the wavelength of the first radio frequency signal.

Furthermore, the metal frame 111 uses the second excitation path PT2 to excite a second resonance mode. The feeding points and the ground points on the metal frame 111 may be adjusted to adjust a resonance frequency of the metal frame 111 in the second resonance mode to a third frequency band (e.g. DCS/PCS/UMTS frequency band). Accordingly, the metal frame 111 uses the second excitation path PT2 to receive and transmit a third radio frequency signal. The third radio frequency signal is for example a signal in the third frequency band. That is, a frequency of the third radio frequency signal is 1900 MHz, for example. In other words, the frequency of the third radio frequency signal is between the frequencies of the first radio frequency signal and the second radio frequency signal. Moreover, the second excitation path PT2 is ½ of a wavelength of the third radio frequency signal. A distance DS1 between the first feeding point F1 and the second feeding point F2 is ⅛-1/10 of the wavelength of the third radio frequency signal.

Figure 4:
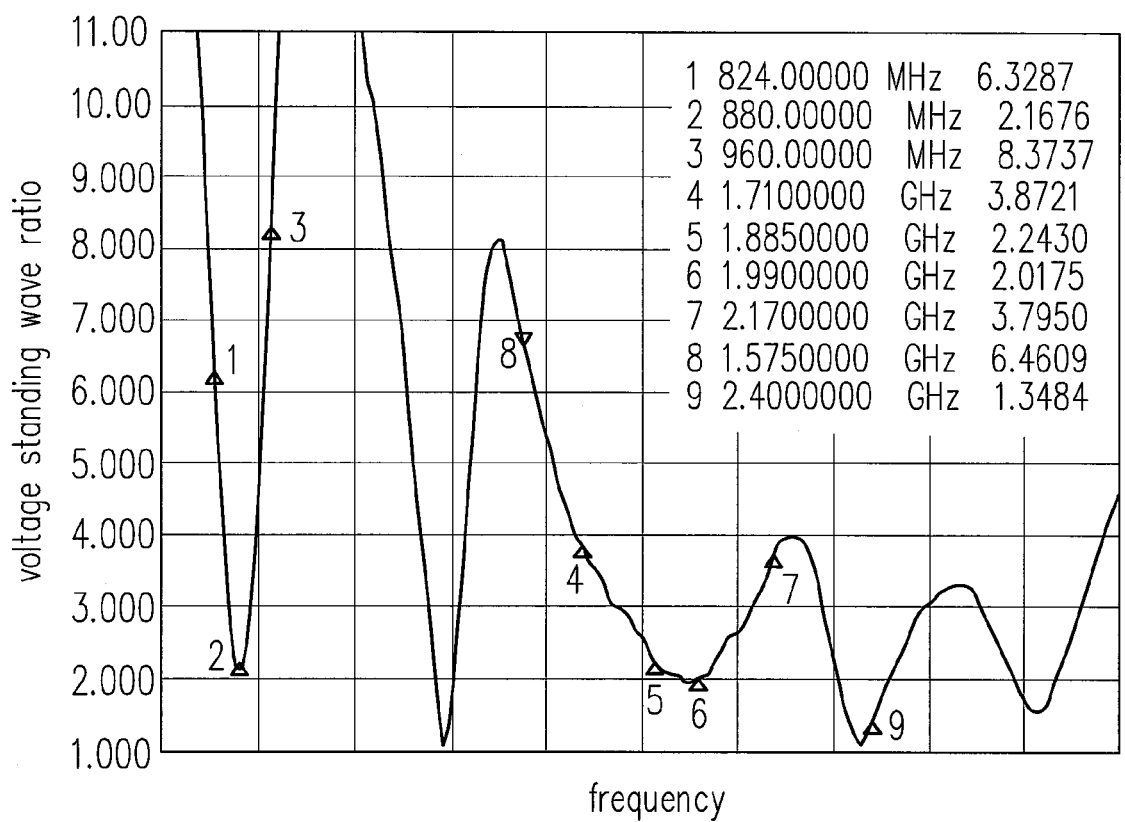
FIG. 4 is a diagram illustrating a simulated voltage standing wave ratio of a metal frame according to an exemplary embodiment of the invention.

According to FIG. 4, as a whole, the metal frame 111 may operate in the first frequency band (e.g. GSM850/EGSM frequency band), the second frequency band (e.g. Bluetooth® frequency band), and the third frequency band (e.g. DCS/PCS/UMTS frequency band) by means of the first excitation path PT1 and the second excitation path PT2. FIG. 4 is a diagram illustrating a simulated voltage standing wave ratio of a metal frame according to an exemplary embodiment of the invention. In terms of adjustment of the operation frequency band of the metal frame 111, in the case that the second feeding point F2 is fixed, a position of the first feeding point F1 may be adjusted to increase or decrease the distance DS1 between the two feeding points F1 and F2, wherein a frequency ratio of the first radio frequency signal and the third radio frequency signal is in an inverse proportion to the distance DS1 between the two feeding points F1 and F2.

After the frequency ratio of the first radio frequency signal and the third radio frequency signal is set, the resonance mode of the metal frame 111 may be adjusted to the first frequency band (e.g. GSM850/EGSM frequency band) and the third frequency band (e.g. DCS/PCS/UMTS frequency band). Thereafter, a position of the first ground point S1 may be adjusted to adjust the harmonic frequency excited on the metal frame 111 in the first resonance mode to the second frequency band (e.g. Bluetooth® frequency band). Because the adjustment of the first ground point S1 may cause the resonance mode of the metal frame 111 to slightly shift out of the first and the second frequency bands, the positions of the two feeding points F1 and F2 are slightly adjusted at the end for the metal frame 111 to operate in the first, the second, and the third frequency bands.

Figure 5:
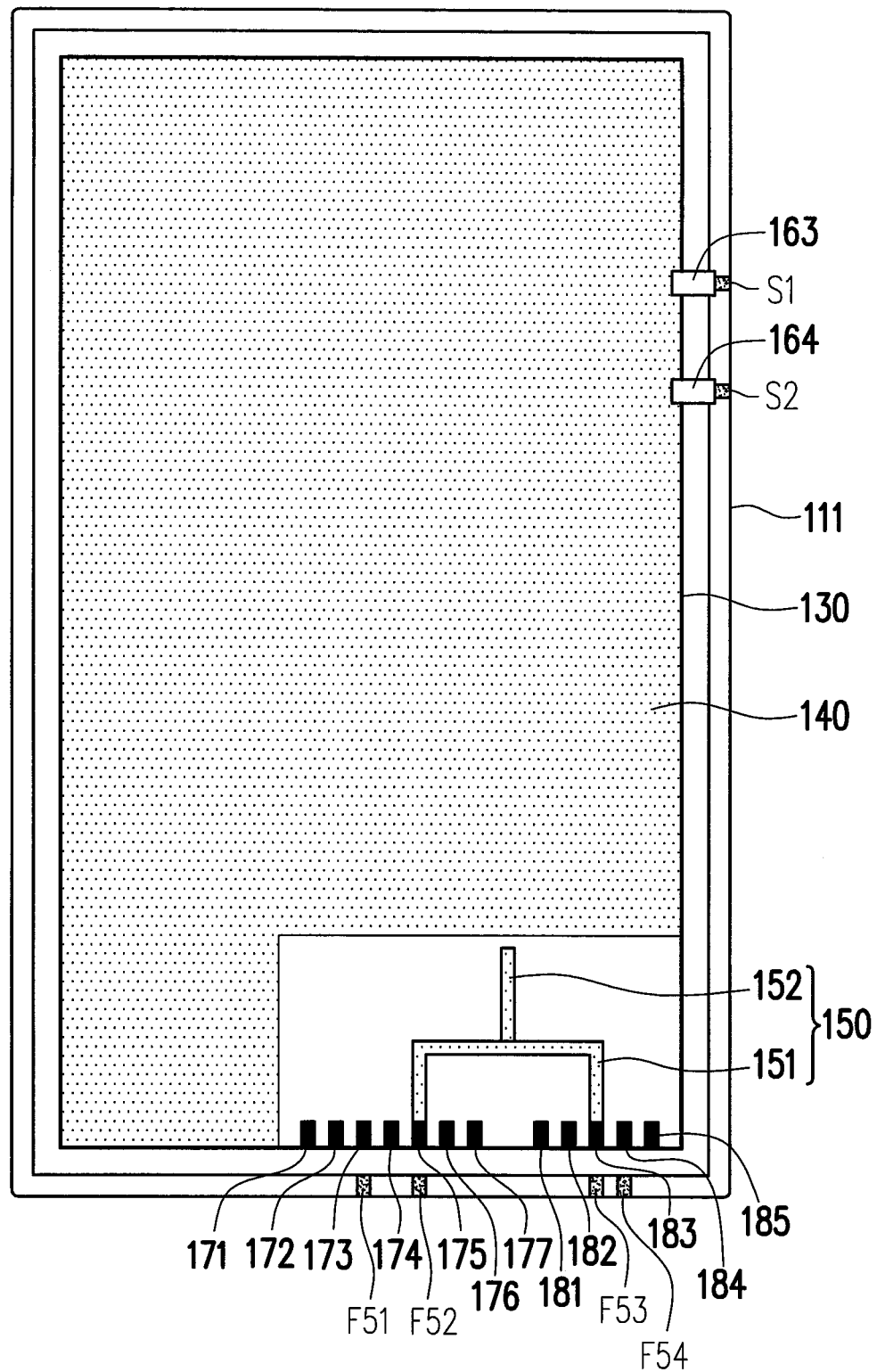
FIG. 5 is a schematic top view of a mobile device according to another exemplary embodiment of the invention.

It should be noted that, in order to facilitate the adjustment of the feeding points, a plurality of pads may be further disposed in the clearance area AR1 of the substrate 130 for the user to vary the connection between the conductive elements 161-162 and the pads, so as to adjust the positions of the feeding points more freely. For instance, FIG. 5 is a schematic top view of a mobile device according to another exemplary embodiment of the invention. To make FIG. 5 easily understandable, the conductive elements 161 and 162 are not depicted in FIG. 5.

Referring to FIG. 5, the mobile device 100 further includes a plurality of first pads 171-177 and a plurality of second pads 181-185. The first pads 171-177 and the second pads 181-185 are all disposed in the clearance area AR1 of the substrate 130. The two ends of the first line segment 151 are electrically connected to the first pad 175 and the second pad 183 respectively. Regarding the adjustment of the feeding point, the position of the first feeding point varies according to the position of the conductive element 161. Therefore, the user may bridge the conductive element 161 between the metal frame 111 and different first pads to change the position of the first feeding point.

For example, if the conductive element 161 is bridged between the first pad 175 and the metal frame 111, the first feeding point is denoted by a mark F52. In addition, if the conductive element 161 is bridged between the first pad 173 and the metal frame 111, and the first pads 173-175 are electrically connected with each other, the first feeding point is denoted by a mark F51. Here the user may use other conductive elements to electrically connect the first pads 173-175. That is, the user varies the connection between the first pads 171-177 and the position of the conductive element 161 to adjust the position of the first feeding point.

Likewise, the position of the second feeding point varies according to the position of the conductive element 162. Thus, if the conductive element 162 is bridged between the second pad 183 and the metal frame 111, the second feeding point is denoted by a mark F53. In addition, if the conductive element 162 is bridged between the second pad 184 and the metal frame 111, and the second pads 183-184 are electrically connected with each other, the second feeding point is denoted by a mark F54. Here the user may use other conductive elements to electrically connect the second pads 183-184. That is to say, the user varies the connection between the second pads 181-185 and the position of the conductive element 162 to adjust the position of the second feeding point.

To conclude the above, the subject application uses the metal frame that is formed on a portion of the periphery and has a continuous and non-interrupted loop structure, to form the loop antenna that operates in multiple frequency bands. In addition that the metal frame is used to form the antenna structure for the mobile device, the metal frame with the antenna function has a smooth streamline shape, which enhances the appearance design and structural strength of the mobile device. Additionally, in comparison with the conventional technology, the clearance area that the mobile device requires is relatively reduced, which is conducive to the miniaturization of the mobile device.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:
1. A mobile device having a periphery and comprising:
a ground plane disposed on a surface of a substrate;
a feeding line disposed on the surface of the substrate and comprising a first line segment and a second line segment;
a resonance element comprising a loop structure and formed on at least a portion of the periphery;

a first feeding point and a second feeding point disposed on the resonance element wherein the first feeding point and the second feeding point are spaced apart by a distance, the first feeding point is electrically connected to a first end of the first line segment, the second feeding point is electrically connected to a second end of the first line segment, a first end of the second line segment is electrically connected to the first line segment, and the mobile device feeds a signal to a second end of the second line segment; and a first ground point and a second ground point disposed on the resonance element and electrically connected to the ground plane, wherein the resonance element comprises a first excitation path extending from the first feeding point to the first ground point and a second excitation path extending from the second feeding point to the second ground point, the first excitation path does not overlap the second excitation path, the resonance element receives and transmits a first radio frequency signal and a second radio frequency signal via the first excitation path, and the resonance element receives and transmits a third radio frequency signal via the second excitation path.

2. The mobile device according to claim 1, wherein the periphery comprises a metal frame, the resonance element is formed on at least a portion of the metal frame, and the metal frame has the loop structure and surrounds the mobile device.

3. The mobile device according to claim 1, wherein the second excitation path is ½ of a wavelength of the third radio frequency signal.

4. The mobile device according to claim 1, wherein the distance between the first feeding point and the second feeding point is ⅛-1/10 of a wavelength of the third radio frequency signal.

5. The mobile device according to claim 1, wherein a frequency of the third radio frequency signal is between a frequency of the first radio frequency signal and a frequency of the second radio frequency signal.

6. The mobile device according to claim 1, further comprising:
    a first conductive element bridged between the first feeding point and the feeding line to electrically connect the first feeding point and the feeding line the first end of the first line segment;
    a second conductive element bridged between the second feeding point and the feeding line to electrically connect the second feeding point and the feeding line the second end of the first line segment;
    a third conductive element bridged between the first ground point and the ground plane to electrically connect the first ground point and the ground plane; and
    a fourth conductive element bridged between the second ground point and the ground plane to electrically connect the second ground point and the ground plane.

7. The mobile device according to claim 1, wherein the first excitation path is ¾ of a wavelength of the first radio frequency signal.

8. The mobile device according to claim 1, wherein the periphery at least comprises:
    a upper housing, comprising a metal frame and at least one frame extension section, wherein the resonance element is formed on at least a portion of the metal frame; and
    a lower housing stacked with the upper housing to form an accommodating space, wherein the substrate is disposed in the accommodating space.

9. The mobile device according to claim 8, wherein the metal frame would be able to form an overall side wall of the periphery and comprises an opening, and the at least one frame extension section partially covers the opening of the metal frame.

10. The mobile device according to claim 8, wherein the upper housing and the lower housing are integrated into a single housing.

11. The mobile device according to claim 1, wherein the substrate further comprises a clearance area, and the feeding line is disposed in the clearance area.

12. The mobile device according to claim 1, wherein the resonance element forms a loop antenna.

* * * * *